United States Patent [19]

Hitchcock

[11] 4,388,495
[45] Jun. 14, 1983

[54] SPEECH RECOGNITION MICROCOMPUTER

[75] Inventor: Myron H. Hitchcock, Englewood, Colo.

[73] Assignee: Interstate Electronics Corporation, Anaheim, Calif.

[21] Appl. No.: 259,695

[22] Filed: May 1, 1981

[51] Int. Cl.³ .............................................. G10L 1/00
[52] U.S. Cl. .................................................. 179/1 SD
[58] Field of Search ............ 179/1 SD, 1.5 B, 1 SC, 179/1 SA, 15.55 R, 15.55 T, 1 VC

[56] References Cited

U.S. PATENT DOCUMENTS

| | | | |
|---|---|---|---|
| 3,238,303 | 3/1966 | Dersch | 179/1 SD |
| 3,333,248 | 7/1967 | Greenberg et al. | 340/172.5 |
| 3,501,750 | 3/1970 | Webb | 340/172.5 |
| 3,536,837 | 10/1970 | Fenton | 179/1 |
| 3,582,559 | 6/1971 | Hitchcock et al. | 179/15 B |
| 3,623,015 | 11/1971 | Schmitz et al. | 340/172.5 |
| 3,723,667 | 3/1973 | Park et al. | 179/100.1 |
| 3,739,085 | 6/1973 | Rosen et al. | 178/6 |
| 3,755,627 | 8/1973 | Berkowitz et al. | 179/1 SA |
| 3,812,291 | 5/1974 | Brodes et al. | 179/1 SA |
| 3,816,722 | 6/1974 | Sakoe et al. | 235/152 |
| 3,870,817 | 3/1975 | Kalfaian | 179/1 SA |
| 3,881,057 | 4/1975 | Adachi et al. | 179/1 J |
| 3,883,850 | 5/1975 | Martin et al. | 340/172.5 |
| 3,943,295 | 3/1976 | Martin et al. | 179/1 SA |
| 3,969,700 | 7/1976 | Bollinger et al. | 340/146.3 WD |
| 4,032,710 | 6/1977 | Martin et al. | 179/1 SA |
| 4,060,694 | 9/1977 | Suzuki et al. | 179/1 SD |
| 4,087,632 | 5/1978 | Hafer | 179/1 SD |
| 4,105,864 | 8/1978 | Berkovitz | 179/1 J |
| 4,107,460 | 8/1978 | Grunza et al. | 179/1 SD |
| 4,109,310 | 8/1978 | England et al. | 364/200 |
| 4,158,750 | 6/1979 | Sakoe et al. | 179/1 SD |
| 4,178,472 | 12/1979 | Funakubo et al. | 179/1 SD |
| 4,181,821 | 1/1980 | Pirz et al. | 179/1 SD |
| 4,189,779 | 2/1980 | Brautingham | 364/718 |
| 4,227,177 | 10/1980 | Moshier | 340/146.3 R |
| 4,254,476 | 3/1981 | Burrows | 365/49 |
| 4,256,924 | 3/1981 | Sakoe | 179/1 SD |

OTHER PUBLICATIONS

Robinson, "Results of a Prototype Television Bandwidth Compression Scheme", IEEE, vol. 55, No. 3, Mar., 1967, pp. 356–359.
Sakoe, "Dynamic Programming Algorithm Optimization for Spoken Word Recognition", vol. ASSP. 26, No. 1, Feb. 1978, IEEE, pp. 43–49.
Tsuruta, "Connected Speech Recognition System DP-100", UDC 534.78:612.781.001.36, by Tsuruta et al., pp. 88–93.
White, "Speech Recognition Experiments With Linear Predication, Bandpass Filtering, and Dynamic Programming", White et al., IEEE, vol. ASSP24, No. 2, Apr., 1976, pp. 183–188 and Title page.

*Primary Examiner*—Emanuel S. Kemeny
*Attorney, Agent, or Firm*—Knobbe, Martens, Olson & Bear

[57] ABSTRACT

A simplified, speaker independent, selected vocabulary, word recognizing microcomputer functions without the use of a typical front end filtering network. The microcomputer identifies vowel-like fricative-like, and silence signal states within a word or phrase by counting speech pattern zero crossings during sequential time periods. Variable zero crossing count thresholds are used to identity states based upon previously identified states, and histeresis is provided, through the use of state time measurement, to prevent state oscillations which would result in erroneous state sequences. The microcomputer, by monitoring zero crossings, defines words as a sequence of vowel-like, fricative-like, and silence states. By limiting the recognizable vocabulary to words which have dissimilar sequences, the incoming speech pattern may be recognized by comparison with state templates defining the limited vocabulary stored in the microcomputer's memory.

20 Claims, 5 Drawing Figures

SPEECH RECOGNITION MICROCOMPUTER

BACKGROUND OF THE PRESENT INVENTION

The present invention relates to speech recognition computers, and more particularly to speaker independent recognition computers. Specifically, this invention relates to a microcomputer used for speaker independent speech recognition with a carefully selected vocabulary which may be manufactured at extremely low cost for specialized applications.

Use of computers to recognize human speech has developed over the last 30 years to provide increasingly complex computerized systems capable of recognizing increasing vocabularies. In addition, substantial effort has been devoted toward the goal of speaker independent recognition systems.

Virtually all of the serious work in speech recognition systems has been based upon a spectral analysis of the incoming voice signals through the use of a bank of band pass filters, each selecting a different frequency band, as a system front end. The signal levels or voice power in each of the band pass filter ranges has typically been sampled at periodic time intervals to provide a frequency vs. time speech matrix for words or phrases. A variety of time normalization techniques have been utilized to recognize words regardless of their time duration, and frequency normalization techniques have been used in attempts to achieve speaker independence.

All of this development, of course, has generated increasingly complex and expensive equipment, placing the advantages of speech recognition beyond the price range for most consumer products. In essence, speech recognition computers have been limited to laboratory tools and input systems for complex equipment, systems having a high enough cost to justify the expense of complicated speech recognition systems as an input medium.

With this development, the utility of a simplified speech recognition device for a variety of consumer products has been overlooked. Furthermore, the techniques utilized for more complex systems do not lend themselves to relatively simple speech recognition systems, since the storage requirements alone for most recognition systems is so substantial that the cost of the memory itself places the systems beyond the reach of the consumer market.

While other systems have recognized the utility of spectral analysis for speech recognition, these systems have attempted to discern relatively similar elements of speech, such as the vowels U and O and the plosives T and B, in order to broaden the system vocabulary.

SUMMARY OF THE INVENTION

The present invention takes a different approach to speech recognition than that which has been typically undertaken in the past. Rather than increase the complexity of the recognition computer to permit speaker independent recognition and broad selection of recognizable vocabulary, the present invention yields speaker independent recognition and low cost by placing strict limitations on recognizable vocabulary. In addition, these results are achieved by concentrating on differentiation between the words of the highly selective vocabulary rather than differentiation of those words from other words in the English or foreign language. The result is an inexpensive word recognition system useful for a variety of consumer and industrial applications in which speech recognition systems have not been cost effective in the past.

The system accomplishes these results without utilizing a typical system front end, that is, a group of band pass filters. Instead, the system input is simply a count of the number of times which the audio signal crosses a threshold level within a predetermined time period. This count yields a frequency average for the voice signal during such predetermined period. Based upon this frequency average, segments of normal speech patterns can be divided into fricative-like periods, that is, periods of relatively high average frequency content, vowel-like periods having intermediate average frequency content and silence periods in which, in terms of zero crossing data, the frequency is very low. Without additional constraints, however, a speech recognition system based only upon such averages would have a relatively high error rate.

The present invention significantly reduces the error rate by introducing, in effect, hysteresis which must be overcome to change from one state to another state within a speech pattern during the recognition process. This hysteresis avoids false state changes which would otherwise occur at the transition between fricative-like sounds and vowel-like sounds and silence, and thus avoids false sequences of state change oscillations. Specifically, for a transition from a vowel-like sound to a fricative-like sound, it has been determined that a preponderance of energy above 2400 hertz is required, which would produce zero crossing counts greater than 24 in a 10-millisecond period. On the other hand, a transition from a silence state to a fricative-like state only requires that a preponderance of the speech energy exceed 1600 hertz. In order to allow a state change from either a fricative-like or silence to a vowel-like sound, most of the speech energy must fall below 1600 hertz, requring zero crossing counts of less than 16 in a 10-millisecond period. Since it has been found that no frequency components in the speech region have occurred when there is no significant energy over 200 hertz, a silence threshold of two zero crossing counts in a 10-millisecond period is used.

In addition, the present invention further reduces the error rate by providing a variable, additional hysteresis level depending upon the previous recorded state. For example, a minimum vowel-like segment of 60 milliseconds is used to identify a true vowel-like sound, down to the shortest expected vowel segments, such as the "uh" sound in the word attack, in the middle of a state sequence. On the other hand, a minimum period of 160 milliseconds is required for identification of a vowel-like ending for a particular word to eliminate artifacts produced by the gradual energy decay associated with fricative-like endings. For example, the "a" sound in the word attack is approximately 300 milliseconds long in a typical speech pattern, since the final "ck" of attack is often unvoiced. The "ac" sound in attack must be recognized as a real ending state if the word attack is to be recognized. On the other hand, it is important that the gradual energy decay at the end of a word such as "rest" not be interpreted as having a vowel-like sound as its last state as the energy from the "st" sound decays. Thus, the position of a state within a recognizable sequence, and the previously recognized state are both used to vary the threshold test used to determine each state within a spoken word.

Thus, by introducing a variable hysteresis level within the recognition system, it is possible to reduce the error rate, even though the speech recognition system operates on a very simplified state basis, so long as the recognizable vocabulary is properly limited to groups of words which cannot have identical state sequences.

The state sequence for a word to be recognized is compared with state sequence templates permanently stored in the system, as in a read-only memory. In order to permit recognition of certain words, it has been found necessary, in order to keep the error rate low but the recognition rate high, to include plural different templates for some of the words to be recognized. These plural templates are used to capture identical words spoken differently by different persons. The plural templates of a given word to be recognized, however, do not overlap with the plural templates of another word to be recognized, such that each recognizable state sequence yields a unique output.

BRIEF DESCRIPTION OF THE DRAWINGS

These and other advantages of the present invention are best understood through reference to the drawings in which.

DETAILED DESCRIPTION OF THE PREFERRED EMBODIMENT

Figures 1, 2:
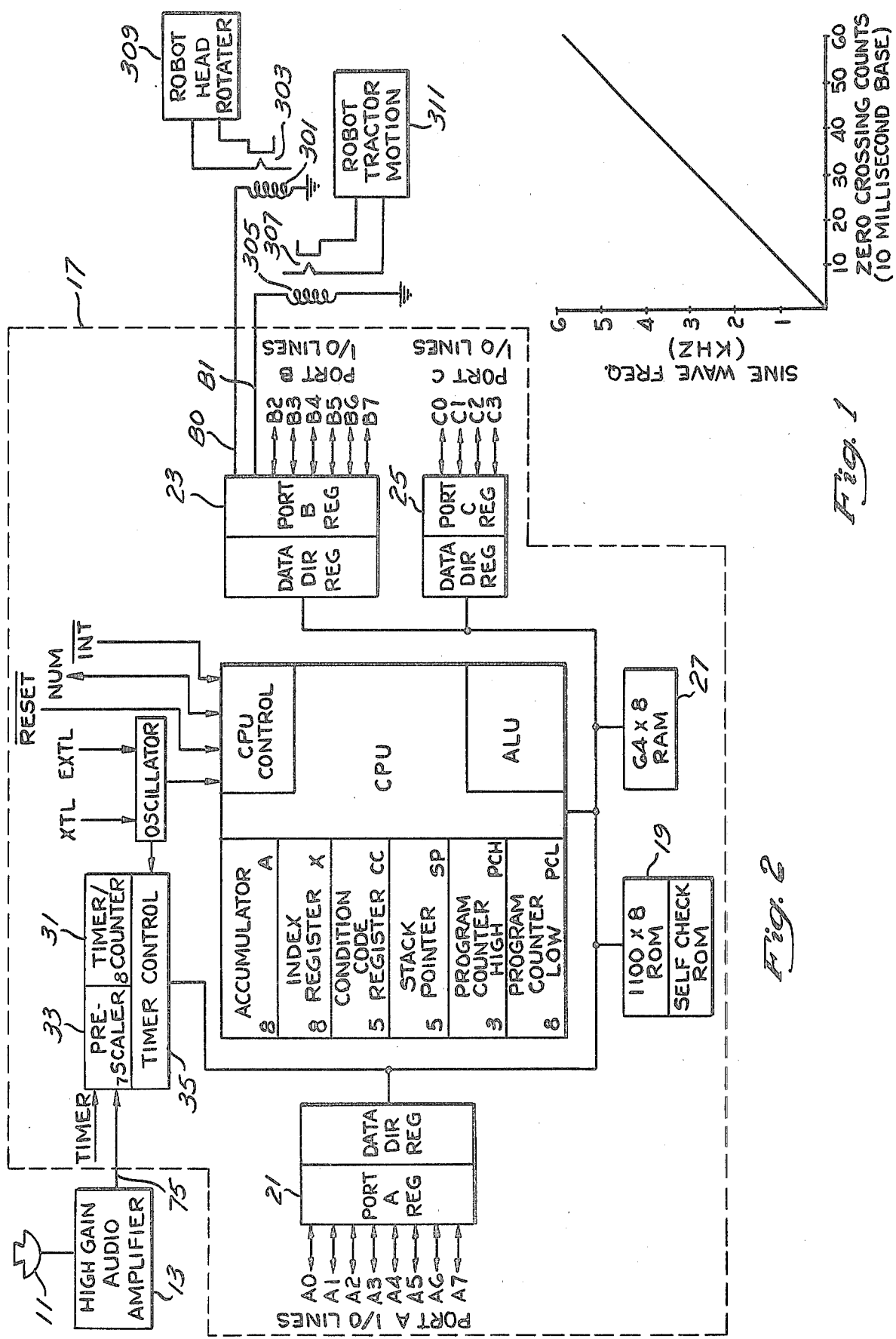
FIG. 1 is a graph of zero crossing counts on a 10-millisecond base versus sign wave frequency.
FIG. 2 is a block diagram of the circuit of the present invention.

Referring initially to FIG. 1, it will be seen that if an incoming speech signal is sampled on a 10-millisecond base, a sign wave frequency of one kilohertz will yield ten positive-going zero crossing counts per 10 milliseconds. Likewise, a frequency of five kilohertz will generate fifty positive-going zero crossing counts per 10 milliseconds, assuming that the zero crossing threshold is anywhere between the peaks of the sensed sign wave. If, in measuring a speech pattern, an amplifier is used which is hard limited, virtually all speech patterns will saturate the amplifier and generate a zero crossing count. Thus, the ultimate count realized by monitoring the electrical signal from a hard limited amplifier provides an average frequency measurement. In the system of the present invention, as shown in block diagram in FIG. 2, a microphone 11 provides an audio signal input to a high gain audio amplifier 13 which is saturated such that all speech signals generate zero crossing data. This signal is supplied on line 75 to the timer input of a microcomputer chip 17, such as an MC6805P2 microcomputer chip manufactured by Motorola Semiconductors. This timer input 75 senses negative going signals at a threshold voltage of 0.8 volts such that, if the audio amplifier 13 provides a 5-volt output at saturation, the input to the timer will occur at a frequency equivalent to the average spectral frequency of the voice signal supplied to the microphone 11.

Within the microcomputer 17, a read-only memory 19 includes firmware for the speech recognition system, as well as firmward speech templates for the words to be recognized. Thus, the predetermined selected vocabulary which the speech recognition system is to interpret is permanently stored in the read-only memory 19 at the time of manufacture of the microcomputer 17, or at least prior to the sale of the microcomputer 17. There is thus no vocabulary training during use of this speech recognition device, and its task is therefore dedicated at the time of original manufacture in order to preset the vocabulary to a group of recognizable words and to make it possible to inexpensively produce the speech recognition system.

In accordance with the firmware stored in the read-only memory 19, the speech recognition system of FIG. 2 analyzes incoming speech data from the microphone 11 in accordance with a process which is diagramed in the flow charts of FIGS. 3 through 6.

Figure 3:
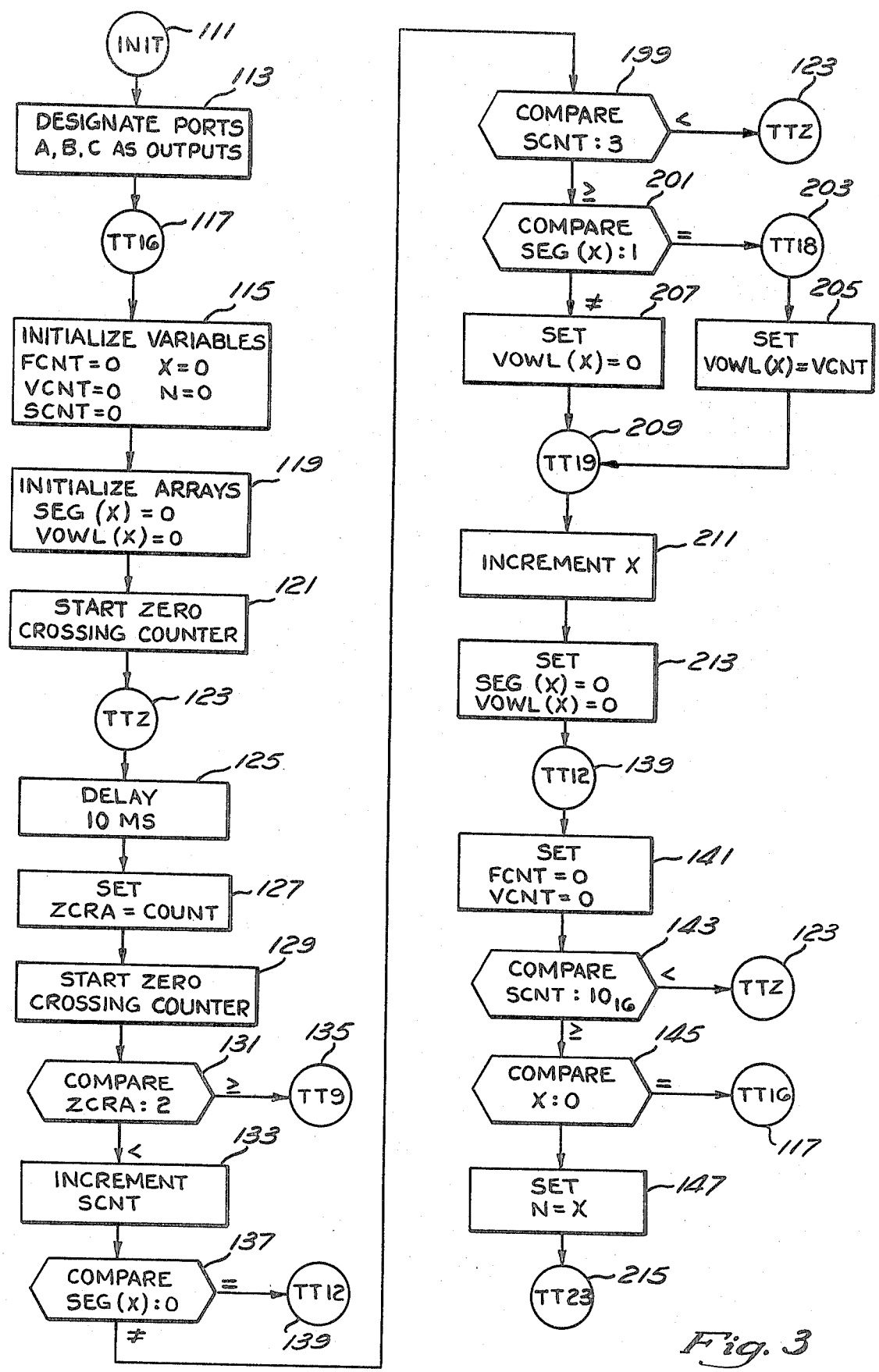
FIGS. 3 through 6 are flow charts showing the operation of the system of the present invention.

Referring initially to FIG. 3, the system is initialized at step 111 when power is initially supplied to the microcomputer 17. This initialization designates the ports A, B, and C; 21, 23, and 25, respectively, of FIG. 2, as output ports for the device. It will be recognized that each of these ports 21–25 can operate as an input or an output for the microcomputer 17, and designation of these ports permits output data resulting from speech recognition to be provided at any of the ports A, B, and C. This designation occurs at step 113 and thereafter variables stored in registers in a random access memory 27 of the microcomputer 17 are initialized at step 115. The flow chart of FIG. 3 and the remaining flow charts of FIGS. 4–6 include return points such as the return point TT16, 117, which permit return of the sequence, as from a branch point, to various jump points within the flow chart.

The variables which are initialized at step 115 include the following: FCNT is a fricative-like count and defines the number of 10-millisecond intervals which have predominantly high frequency or fricative-like sound energy. VCNT is a variable used to count vowel-like 10-millisecond intervals having predominantly lower frequency speech power. SCNT is a variable used for counting 10-millisecond silence intervals having virtually no speech content. X is a pointer variable used for identifying, by number, the successive states (fricative-like, vowel-like, silence) within a state sequence used to identify a speech pattern. The variable N defines the total number of states for an incoming word.

At step 119, a pair of arrays are initialized. Array SEG(X) contains the actual state sequence for an incoming word, that is, data for each segment X identifying each segment as fricative-like, vowel-like, or silence. The array VOWL(X) defines the length of a vowel state, that is, the number of ten millisecond vowel periods within a segment X identified as a vowel state.

These variables and arrays may be better understood through the following table:

TABLE 1

| SEG(X): | fricative-like | = 2 |
|---|---|---|
| | vowel-like | = 1 |
| | silence | = 0 |

Word: SIX

| X | 1 | 2 | 3 | 4 |
|---|---|---|---|---|
| SEG(X) | 2 | 1 | 0 | 2 |
| VOWL(X) | | 0 | | |

N = 4

From the above table it can be seen that SEG(X) is defined as 2 for a particular state within a word if that state is fricative-like, that is, primarily high-frequency acoustic energy. Similarly, if the word state is primarily vowel-like, SEG(X) is defined as 1, while a 0 defines a silence state. As shown above, for the word six, in a typical pronounciation, there are four successive states such that N is equal to 4. For values of X from 1 to 4, SEG(X) is the sequence 2 1 0 2, or fricative-like, vowel-like, silence, fricative-like. The initial "S" of the word six provides the fricative-like state where "X" equals 1. The vowel in the word six provides the vowel-like state wherer X equals 2. Prior to the formation of the X sound in the word six, the vocal passage, in storing energy for sounding the fricative X, closes to produce a momentary silence defined at X=3 by SEG(X)=0. This short silence is followed by the fricative-like X sound at X=4, shown by SEG(X)=2.

The array VOWL(X) stores the value Q defining the duration of the vowel-like sound at X=2, that is, the letter "i" in a word six.

As will be better understood through the description as follows, in order to define, for example, the fricative-like state at X=2 or =4, the fricative-like sound energy must have a predetermined duration. This duration is measured by the variable FCNT which counts ten millisecond time periods during which the fricative-like energy occurs. Similarly, the vowel-like state at X=2 in the example above, requires that a vowel-like average frequency exist for a predetermined duration, which is stored using the variable VCNT. A variable SCNT is used to count silence duration in a similar manner.

Returning now to the sequence illustrated in FIG. 3, following the initialization of variables and arrays at steps 115 and 119, the zero crossing counter 31 within the microprocessor 17 is started at step 121. This allows the counter 31 to increment each time the output signal from the high-gain audio amplifier 13 crosses the threshold point of a prescaler 33, in this example 0.8 volts. A return point TT2 is shown at 123 in FIG. 3 and is used, as described above, to provide looping within the system. At step 125 a delay of ten milliseconds is initiated immediately after the zero crossing counter is started at step 121. This ten millisecond delay is measured by the timer 31 and timer control 35 shown in FIG. 2. At the end of this ten millisecond delay, a variable, ZCRA, stored in the ram 27 of FIG. 2, is made equal to the count within the counter 31, that is, the total zero crossing count for this ten millisecond period. With this value stored, as shown at step 127, the zero crossing counter 31 is immediately reset and started again at step 129, so that the zero crossing data for the next ten millisecond period can be accummulated while the zero crossing data from the first ten millisecond period, stored as the variable ZCRA in the ram 27, is analyzed. The microprocessing system is fast enough to permit the entire remaining portion of processing, as it relates to the first ten millisecond time data, to be completed before the end of the ten millisecond delay at step 125. Thus, as will be seen in the description which follows, after this initial ten millisecond data is analyzed, the program will return to point TT2, 123 to wait for the end of the next ten millisecond period at step 125, so that the next zero crossing count can be recorded at step 127.

The first step in analyzing the incoming zero crossing count is to compare this count with two. If the zero crossing count is below two, as shown in FIG. 1, the primary energy entering the system on line 75 is below 200 hertz, or non-existent in the case of no zero crossings. This is interpreted as a silence period. Thus, the comparison which occurs at step 131 defines a flow chart branching step, directing the continued processing to step 133 if the zero crossing count is less than two, and directing it to looping point TT9, 135, if the zero crossing count exceeds two. In other words, if, during this ten millisecond period, the incoming signal on line 75 (FIG. 2) indicates silence, the sequence will continue at step 133. If, on the other hand, recognizable sounds are present, the program will jump to TT9, 135.

If we assume that for this particular 10-millisecond period the zero crossing count, stored in the ZCRA register location, is less than two, indicating silence, Step 133 increments the variable SCNT, the silence counting variable, so that this variable now equals one, indicating one 10-millisecond period of silence. As will be seen in the description which follows, the variable SCNT is used to count the total number of 10-millisecond silent increments to determine whether an actual silence state exists. At the point of the sequence presently being described, of course, if the entire process is just beginning, this initial silence increment indicates that the speech sound to be recognized has not yet begun. This fact is determined, at Step 137, which compares the value SEG(X) with zero to determine whether the current segment, that is, the most recent state that has been monitored, is equal to zero, or silence. Since, in our example at the beginning of program operation, SEG(X) was made equal to zero at Step 119, the branch Step 137 will direct the sequence to continue at point TT12, 139. This return point TT12, 139 provides a jump in the sequence to return point 139 shown later in the flow chart of FIG. 3. Since, as previously noted, we are currently in a silence state and have measured another silence increment, and have incremented the silence count at Step 133. The return point 139 continues the sequence at Step 141 where the FCNT variable and VCNT variable are set to zero. The total silence count is next compared with the hexadecimal numeral 10, at Step 143, this numeral equaling 16 decimal. In essence, this Step 143 determines whether the silence count has reached 16, indicating a total silence duration of 16 times 10 milliseconds, or 160 milliseconds. If the silence count is less than 16, the program branches to return point TT2, 123, which was previously described, to acquire more zero crossing, 10-millisecond data. If, however, there are 16 silence counts, the sequence will continue at Step 145.

At step 145, the variable X is compared with zero to determine whether any states have been recorded for this word. Essentially, this Step 145 is a test to determine whether the sequence is still waiting for the initial portion of a word. If X is equal to zero, the program returns to return point TT16, 117 where the variables and arrays are again initialized at Steps 115 and 119 and data collection resumes at Step 121.

At some point in time, after the program has been continuously looping through the above-described sequence, reinitializing itself each 160 milliseconds of silence, a word is spoken, providing the initial meaningful zero crossing data on line 75 (FIG. 2). At the point in time when a 10-millisecond sampling period yields a ZCRA zero crossing count in excess of two, the Step 131 will branch the program to return point TT9, 135. This return point TT9, 135 is shown as the initial step in FIG. 4.

Figure 4:
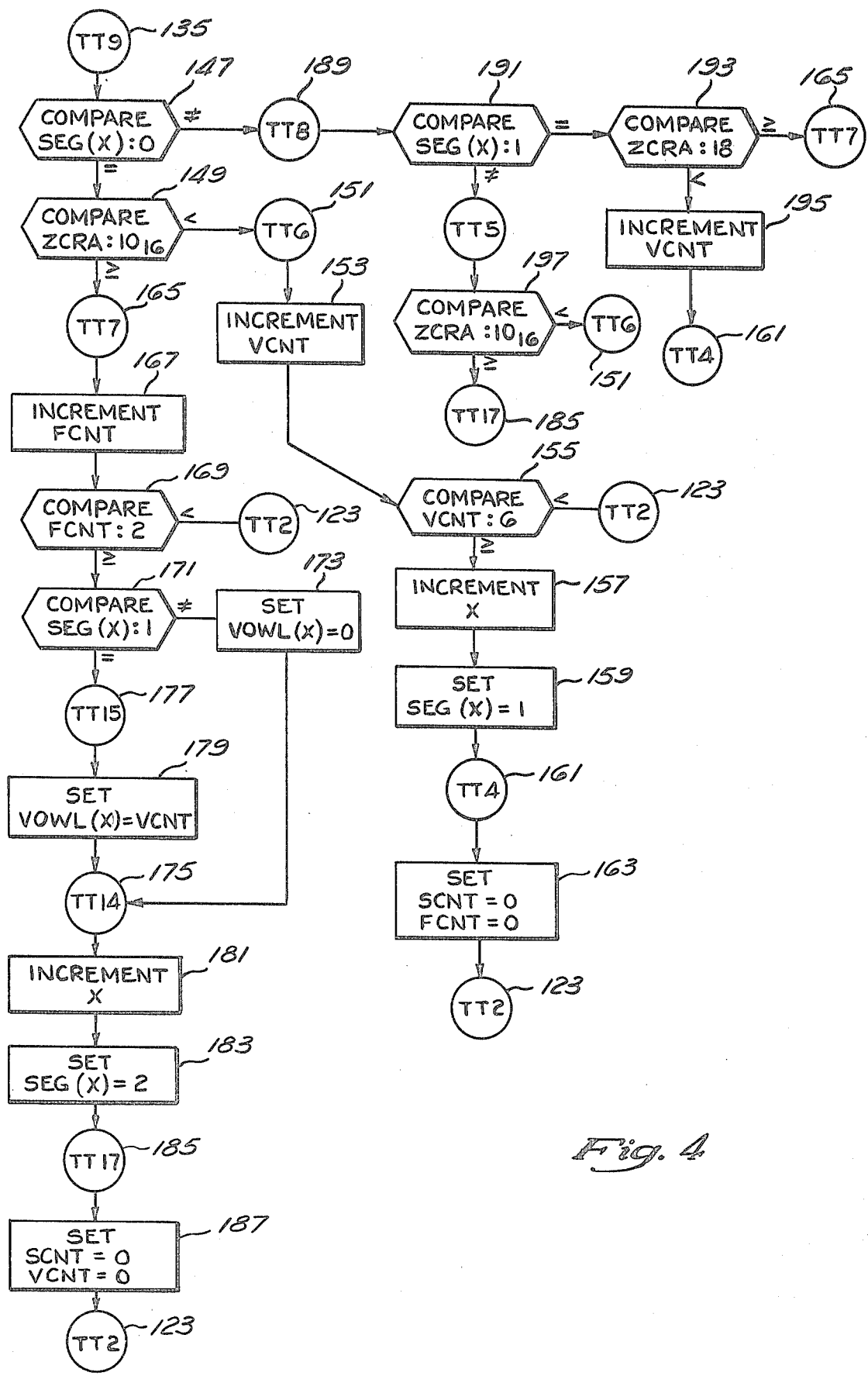

FIG. 4 is only entered at point TT9, 135 when the current sample indicates that the incoming speech on line 75 (FIG. 2) is not silence. It must now be determined whether the sound is fricative-like or vowel-like in this 10-millisecond interval. This test is initiated at the branch Step 147 which compares the current state SEG(X) with zero. If, in the present example, the sequence is at the beginning of a speech sound, it will be recalled that SEG(X) had been set to zero at Step 119 and thus the sequence will continue at branch Step 149. At this step, the zero crossing count, ZCRA, is compared with hexadecimal 10, or decimal 16. If the zero crossing count is less than 16, and more than 2, as was determined at Step 131, the average frequency during the 10-millisecond period being examined, as shown in FIG. 1, is above 200 hertz, and below 1600 hertz, and is interpreted as a vowel-like sound. Thus, after passing a return point 151, the Step 153 increments the variable VCNT, which is used to count vowel-like 10-millisecond intervals. At Step 155, the value of the variable VCNT, that is, the total number of vowel-like 10-millisecond intervals, is compared with 6, to determine whether there have been 60-milliseconds of vowel-like intervals. In the present example, the branch Step 155 would indicate that, since we are just beginning a word, the value VCNT would have been incremented to one at Step 153, and the sequence is returned to return point TT2, 123, to collect additional 10-millisecond input data. Thus, no state has yet been recognized, since a single 10-millisecond sampling period is insufficient to define a vowel-like state. However, the variable VCNT has been incremented so that we can continue to count vowel-like 10-millisecond periods to determine if this word actually begins with a sound which has its primary energy at a frequency between 200 and 1600 hertz.

If we now assume that, by returning to return point TT2, 123, five additional times, each time following the sequence described above so that the Step 153 has incremented the variable VCNT to the value 6, the sequence will continue at Step 157 where the pointer variable X is incremented, so that it now equals 1, identifying the first state within the word to be recognized. At Step 159, the first value of the SEG(X) is set to 1, indicating a vowel-like state for SEG(1).

Having defined the first state at Step 159, the program continues through return point 161, TT4, to Step 163 where the variable SCNT and FCNT are set to zero, in case there were intervening silence counts and fricative-like counts during the time period when 6 total vowel-like increments occurred, so that a new counting of SCNT and FCNT variables may resume, and the sequence is continued at return point 123 shown in FIG. 3.

If at the beginning of this word, a fricative-like sound, rather than a vowel-like sound, appeared on line 75 (FIG. 2), the branching test at step 149 would have yielded a zero crossing count in excess of hexadecimal 10, or decimal 16, indicating an average sound frequency in excess of 1600 hertz. In this instance, the sequence continues through return point TT7, 165, to step 167 where the FCNT variable, which counts fricative-like 10-millisecond samples, is incremented. The variable FCNT is next compared with the value Z at Step 169, to determine whether a total of 20-milliseconds of fricative-like sound has been monitored. If less than 20-milliseconds of fricative-like sound has been monitored since the last state definition, the program will return to point TT2, 123. If, however, the variable FCNT is equal to or greater than the value 2, the branching step 171 compares the most recently defined word state, that is, SEG(X), with the value one to determine whether the most recently defined word state is a vowel-like sound. In the example that we have been describing, it will be recognized that SEG(X) had been set at zero and thus the program would continue at step 173 where the variable VOWL(X) would be set to zero and the program would return at point TT14, 175. In later instances, other than at the beginning of a word, it will be useful to store the total vowel count variable, VCNT, when a vowel-like sound precedes a fricative-like sound. Thus, if the test at branching step 171 indicates that the state monitored most recently is a vowel, the program will continue through return point TT15, 177, to set a variable VOWL(X) equal to the value VCNT previously stored at the incrementing step 153. This occurs at step 179. The procedure will then continue through return point TT14, 175, to increment X at step 181 in a manner similar to the previously-described step 157, to define the next state in the SEG(X) array as a fricative-like sound, that is, two, at step 183, similar to the step 159 previously described, and will continue through return point TT17, 185. In a manner similar to the step 163, previously described, the sequence at step 187 then resets the variables SCNT and VCNT and returns the program to point TT2, step 123, of FIG. 3, for the collection of additional data.

From the above description, it can be seen that if the previous state were silence, as was determined at branch step 147, a total vowel-like duration of 60 milliseconds will define a vowel-like state and a total fricative-like duration of 20 milliseconds will define a fricative-like state as the first state of this word to be recognized.

In essence, what has been described thus far is a form of hysteresis in the system which requires that a predetermined state last through a predetermined time, 60 milliseconds in this case for vowel-like sounds and 20 milliseconds for fricative-like sounds following a silence, in order for the system to accept the incoming data as a particular state.

As will be seen in the description which follows, identification of the previous state is used to vary the frequency discrimination that is used for determining whether a particular sound is vowel-like or fricative-like. Thus, at step 149, because the previous state had been defined at step 147 as silence, frequencies in excess of 1600 hertz were defined as fricative-like. As will be seen from the description which follows, if the most recently defined state were a vowel, a particular 10-millisecond interval will not be defined as fricative-like, unless the average frequency content of the interval exceeds 2400 hertz. This is an additional form of hysteresis which makes it more difficult to recognize a fricative-like sound following a vowel than a fricative-like sound following silence, since it has been found that error rates are reduced if the threshold for passing from a vowel-like sound to a fricative-like sound is increased. Thus, in addition to the basic hysteresis of the system generated by the fricative-like and vowel-like duration requirements at steps 169 and 155, respectively, a variable hysteresis is introduced in the system by varying the frequency transition point between vowel-like and fricative-like 10-millisecond intervals, depending upon the previous word state.

The following sequence describes this hysteresis principle. If, at step 147, it was determined that the most recently defined word state was not silence, the program sequence would continue through return point TT8, 189, to branch step 191 where it would be determined whether the previous word state was a vowel-like sound by comparing SEG(X) with the value one. If the previous state were a vowel-like sound, the sequence would branch to step 193 where the zero crossing count would be compared with the hexadecimal value 18, that is, decimal value 24, indicating a frequency average of 2400 hertz. If the value did not exceed 2400 hertz, the program would proceed to step 195, incrementing the variable VCNT, identifying this 10-millisecond period as vowel-like, and returning the sequence to return point TT4, 161, previously described. If, on the other hand, at branch point 193, the frequency content exceeds 2400 hertz, the program would proceed to return point TT7, 165, previously described, and would increment the variable FCNT at step 167. Thus, the frequency threshold for a fricative-like 10-millisecond period depends upon whether the previous recorded word state was a vowel or silence state.

It should be noted that the branch step 193 is only reached if the previous state is a vowel-like sound, that is, the test conducted at step 155 has already indicated that 60 milliseconds of vowel-like sound has occurred and the array SEG(X) has been set at step 159 to indicate a vowel-like state. It is not desired, of course, to follow one vowel-like state with another vowel-like state since this would only be an indication of a relatively long vowel sound. Thus, the incrementing of VCNT which occurs at step 195 and the return of the program to return point TT4, 161, simply allows an accumulation of successive vowel-like intervals once a vowel-like state has been defined until some other interval, silence or a fricative-like sound, is encountered, the additional vowel-like intervals not yielding an additional vowel-like state.

Similarly, at branch point 191, if the comparison of SEG(X) with one indicates that the previous state is not a one, and since the branch step 147 has indicated that the previous state is not silence, the program will branch to step 197 if the previous state identifies a fricative-like sound. In this instance, if the zero crossing data for the most recent 10-millisecond interval exceeds 16, there is a continuation of the fricative-like sound which yielded the most recent fricative-like state and the program branches to return point TT7, 185, previously described, to allow the program to accumulate additional fricative-like 10-millisecond intervals without yielding an additional fricative-like state, since two successive fricative-like states would erroneously indicate two fricative forms within a word in successive positions rather than a relatively long fricative-like sound. If, on the other hand, the previous state were a fricative-like sound, and the most recent 10-millisecond interval sample yields a frequency average below 1600 hertz, the branch step 197 will return the program to return point TT6, 151, previously described, to identify the beginning of a vowel-like sound.

It is important to recognize that following the step 195, the continuation of a vowel-like count beyond the count 6, defined at step 155, the program returns at return point 161 to set the variables SCNT and FCNT to zero so that occasional silence-like intervals and fricative-like intervals in the middle of a vowel-like sound will not accumulate, to erroneously indicate a silence state or fricative-like state, unless these 10 millisecond samples occur successively. Thus, so long as a single fricative-like or silence sample interval occurs in the middle of a vowel-like counting sequence, the variables SCNT and FCNT will be zeroed to prohibit accumulation of non-successive counts of these variables.

A similar sequence occurs at return point TT17, 185, resetting the variables SCNT and VCNT at Step 187, so long as fricative-like sounds are occurring and only isolated silence intervals and vowel-like intervals occur.

Returning again to FIG. 3, it will be recalled that the sequence branched to return point TT9, 135, from branch Step 131 if some sound was present, indicating a non-silence interval, and that, at Step 137, the sequence branched to return point TT12, 139, if a silence interval was at the beginning of a word. If, at branch Step 137, it is determined that the most recent recorded word state is not silence, and since at Step 131 we have determined that the current 10 millisecond sample interval is a silence state, the sequence will branch to Step 199, where the current value of the variable SCNT will be compared with the value 3. That is, a determination will be made as to whether the silence duration has exceeded 30 milliseconds, a sufficiently time period to capture the short silent states within words, such as the preplosive closure of the vocal passage during which vocal energy is stored for the plosive sound. If the variable SCNT does not exceed 3, the program branches to return point TT2, 123, to collect more interval data. If the variable SCNT exceeds the value 3, the program will continue at branch Step 201 to test whether the most recently recorded word state is a vowel-like sound. If the last state prior to a silence state is a vowel-like state, the program continues through return point TT18, 203, to Step 205 where the variable VOWL(X) is set equal to the variable VCNT which was previously set to equal the total duration of the vowel-like sound at Step 179 (FIG. 4). If the most recent state were a fricative-like sound, the branch Step 201 would continue the program to Step 207, at which the variable VOWL(X) would be reset to zero. The sequence then continues through return point 19, 209 to the Step 211 where the value X is incremented and, because the silence count variable SCNT has exceeded 3 (Step 199), the variable SEG(X) is set to define a silence state at Step 213. At the same time, the variable VOWL(X) is reset, this being the next successive location in the VOWL array after the location set at Step 205, due to the incrementing of X at Step 211.

As previously described, the Step 141 then resets the variables SCNT and FCNT, and a comparison is made at Step 143 to determine whether the total duration of silence, that is, the value of the variable SCNT, exceeds 16. Once the silence count has exceeded 160 milliseconds, a determination is made at branch Step 145, as previously described, whether previous word states have been recorded. If word states have been recorded, a silence duration of 160 milliseconds is defined as sufficiently long to indicate the end of a word and thus the program branches to Step 147 where the variable N, indicating the total number of states within the word, is set equal to the variable X, which now defines the total number of word states which have been recorded. At the completion of Step 147, the sequence continues through return point TT23, Step 215, to the sequence of steps diagramed on FIG. 5.

Figure 5:
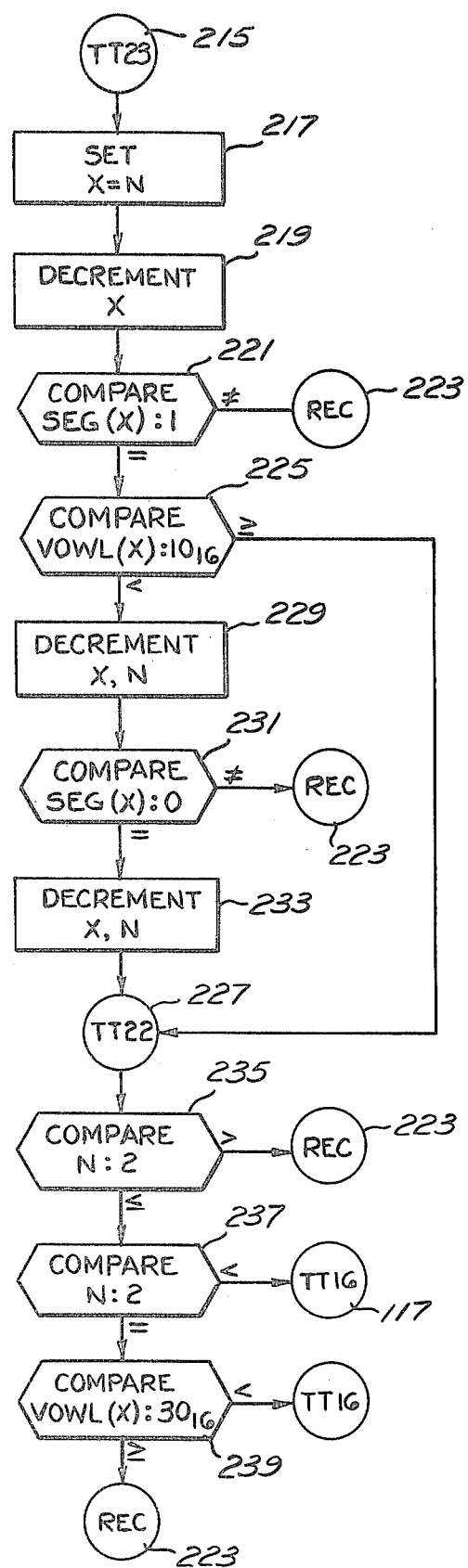

As will be seen from the following description, the sequence of steps of FIG. 5 is used to check the last recorded word state to determine if it was a short vowel-like sound. Since it has been determined that a short vowel-like segment at the end of a word is often an erroneous vowel indication, relating instead to the energy decay at the end of a fricative-like sound, the sequence of steps shown in FIG. 5 is used to eliminate from the state sequence such a short vowel-like ending sound.

Initially, the variable X is set to equal the variable N at Step 217 such that the variable X now indicates the last recorded state which, as has been noted, is silence because the sequencing has defined all words as ending with a silence state exceeding a 160 millisecond interval. At Step 219, the variable X is incremented to identify the next previous word state prior to the ending silence. This next previous word state is identified at Step 221 by comparing SEG(X) with the value 1 to determine whether this next previous word state was a vowel-like sound. If it is not a vowel-like sound, the program branches to return point REC, 223, shown in FIG. 6. If, on the other hand, the last word state recorded prior to the ending silence is a vowel-like sound, the branch Step 225 compares the total duration of that vowel-like sound with 160 milliseconds by comparing the variable VOWL(X), set at Step 205 (FIG. 3), with the value hexadecimal 10, or decimal 16. If the vowel-like sound exceeded 160 milliseconds, the sequence continues at return point TT22, 227. If, on the other hand, the ending vowel-like sound was shorter in duration than 160 milliseconds, it has been determined that this is a false ending vowel. For this reason, Step 229 is used to decrement both the variables X and N to effectively eliminate this erroneous state. Step 231 is then used to determine whether a silence state occurred immediately before the erroneous ending vowel-like state. If a silence state did not precede this erroneous vowel-like state, the sequence continues at the return point REC, 223. If, however, a silence state did precede the erroneous vowel-like state, the silence state is also erroneous, and thus, at Step 233, the values X and N are again decremented to eliminate the erroneous silence states.

Figure 6:
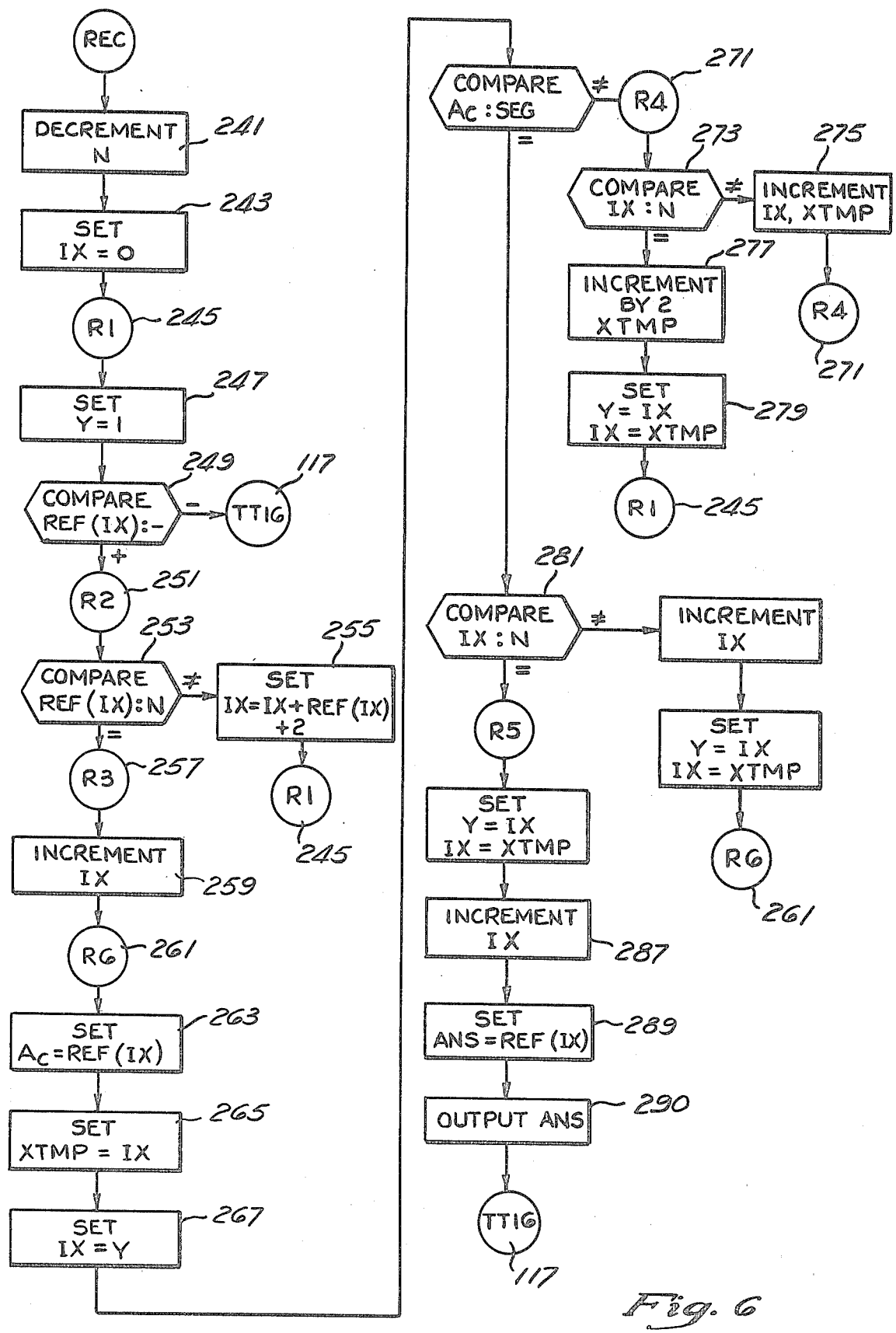

Although the array SEG(X) has not been reset to physically eliminate the recorded erroneous states, the decrementing of the value N, as will be seen through the description of FIG. 6, effectively eliminates these erroneous states from participating in the word recognition sequence.

Having thus eliminated the erroneous ending states, the program continues from return point 227 to branch Step 235 which compares the variable N with the value 2. It should be recognized that the variable N is one greater than the actual number of meaningful states within the state sequence, since the last state recorded is the silence state at the end of any word. Thus, the comparison of N with 2 determines whether there was more than one meaningful state within the state sequence. If the variable N exceeds 2, a meaningful state sequence has been defined and the sequence of steps branches to Step 223, FIG. 6. If the value of N is less than or equal to the value 2, Step 237 compares the value N with the value 2 again to determine whether the value is 1 to 2. If the value is 1, we have essentially removed the entire state sequence, since the single state will be the silence at the end of the word and there will be no meaningful state sequence. Thus, the program is returned at return point 117, TT16, to FIG. 3.

If at branch Step 237, it is determined that the value of N is 2, so that there is one meaningful word state within the word, the value of the variable VOWL(X) is compared with the value hexadecimal 30 or decimal 48, indicating a vowel-like duration of 480 milliseconds at Step 239. Since there is only a single vowel-like state in the word, the sequence requires that the vowel-like state have a duration of at least 480 milliseconds in order for this state, by itself, to be meaningful. If the duration is less than 480 milliseconds, the sequence returns to TT16, Step 117, FIG. 3 for reinitialization. If, on the other hand, the vowel-like state duration exceeded 480 milliseconds, the sequence continues to return point REC, Step 223, FIG. 6. It should also be recognized that, if the single state sequence includes only a fricative-like sound, the Step 187 (FIG. 4) would have set the value VCNT to zero. Therefor, the branch Step 239 will effectively eliminate a single fricative state sequence, returning the program to return point TT16, 117, to reinitialize the sequence.

Referring now to FIG. 6, a recognition sequence is diagrammed which begins at return point REC, 223. This sequence is utilized for comparing the new word defined by the state sequence stored in the array SEG(X) described previously with plural word templates permanently stored in the read-only memory 19 of the microprocessor (FIG. 2). The templates are stored in an array identified as REF(IX) in the following format:

TABLE 2

| Word: | SIX | First Template | | | | | | Next Template | | | |
|---|---|---|---|---|---|---|---|---|---|---|---|
| | IX | 0 | 1 | 2 | 3 | 4 | 5 | 6 | 7 | 8 | 9 |
| | REF(IX) | 4 | 2 | 1 | 0 | 2 | 8 | | | | |

A pointer IX is used to define successive memory bytes in the array REF(IX). Each word template within the read-only memory 19 begins with a designation of the number of states in the word template. In the example given above in Table 2, the number of states is 4, stored at REF(0). This initial designation is followed by the sequence of states within the word template. In this case, similar to Table 1 above, a typical template for the English word six is stored as the following sequence: fricative-like, vowel-like, silence, fricative-like; that is, 2102; stored at locations IX=1 through 4. If the template had been a three state template, the initial location REF(0) would have been the numeral 3, and only three state identifiers would have followed at IX=1 through 3. The state sequence is followed by a word number which identifies the word relating to the particular template. In the case of Table 2, the word identifier number is the numeral 8, located immediately following the state sequence at REF(5). The numeral 8 in this case identifies the English word 6 and is an arbitrary identifier used for output purposes for the microprocessor 17.

As shown in Table 2, the next successive word template follows immediately after the first word template at locations REF(6) and following, with the number of states of this next template stored at REF(6). Each of the templates is thus successively stored in the read-only memory is at successive locations IX, although the state sequence templates may have different lengths.

In order to identify a new word, the state sequence of the new word is compared with each of the word templates within the read-only memory 19 until an exact match is achieved. Once an exact match is achieved, the word number identifier, such as the number 8 stored at REF(5) in Table 2, is output from the microprocessor to define the recognized word and to implement further system response as a result of recognition of a particular word.

Referring to FIG. 6, the initial step in this recognition sequence is shown at Step 241 as a decrementing of the variable N which, as previously discussed, defines the total number of states in the new word to be recognized. It will be recalled that the value N includes the final silence state of the new state sequence and the decrementing at Step 241 is used to reduce the total number of states to the actual meaningful states, without this final silence state, within the word to be recognized. Next, at Step 243, the variable IX is reset to zero to begin the comparison sequence at the beginning of the template array within the read-only memory 19 (FIG. 2). The sequence continues through a return point R1, 245 to Step 247 where a pointing variable Y is initially set to the value 1. Next, at Step 249, a branching test is utilized to compare the value REF(IX) to determine whether this value is a negative number. The template sequence stored within the read-only memory 19 ends with a negative number at the last position REF(IX) so that the end of the template array can be identified. When the branch test 249 is reached if the current value of REF(IX) is negative, the recognition sequence has reached the end of the template array without having achieved a perfect match between the new word store sequence and any template within the array, and thus the sequence will branch to return point TT16, 117 (FIG. 3). This indicates that the most recently stored new word store sequence fails to match any recognizable template within the read-only memory 19 and the recognition sequence should be completely reinitialized.

It should be understood that, at the branch test 249, the value IX is always such that the value REF(IX) will identify the number of states of a word template. Thus, for example, referring to Table 2 the value IX at the step 249 may be either 0 or 6 or any other initial digit in a word template.

If the comparison made at the test step 249 indicates that the value REF(IX) is a positive number, such that an additional word template is available for comparison, the sequence continues through return point R2, 251 to branching step 253. At this step a comparison is made between the value REF(IX), which defines the number of states in the word template, and the value of N, which defines the number of states in the new word. If the number of states is different, this next word template cannot provide an exact match for the new word state sequence. In this instance, the branching step 253 continues the sequence at step 255 which resets the value IX to a value equal to IX plus REF(IX) plus 2. Since REF(IX) is equal to the number of states in the next word template, and since each word template includes two digits in addition to the state sequence, the step 255 will increase the value of the index IX so that it identifies the digit of the next adjacent template which specifies the number of states in that next adjacent template. At this point, the sequence continues to return point R1,245 to determine whether the next template within the read only memory 19 (FIG. 2) has the same number of states as the new word. Once a template is reached which equals the number of states of the new word, the branch test 253 will continue the test through return point R3,257 to step 259, at which point the index value IX is incremented. IX, it will be recognized, now identifies the first state within this template which has the proper number of states.

After passing a return point R6,261 the first state of this next template, that is, the fricative-like, vowel-like or silence identification of the first state, is stored in a register AC at step 263. Next, at step 265, the index value IX is temporarily stored in a register XTMP and, at step 267, the index IX is set equal to Y.

Next, at step 269 a comparison is made between the value stored in the AC register, that is, the first state of the template being examined, and the first state of the new word located at SEG(IX). If these states are not identical indicating that this template will not provide an exact match for the new word, a sequence of steps following a return point R4,271, is undertaken to access the next state template in the read only memory 19 (FIG. 2). This sequence is initiated at the branching step 273 which comparies the current value IX with N to determine whether the end of the state sequence in the word template which did not match has been reached. If not, the step 273 continues the sequence at step 275, where the variables IX and XTMP are incremented, and the sequence returns through the return point R4,271, to again compare the values IX and N. Once this comparison step 273 provides a match, indicating that the end of the template has been reached, the variable XTMP is incremented by 2 to place the pointer at the digit identifying the number of states for the next template. This incrementing occurs at step 277. Step 279 next sets the value of the variable Y to equal IX and the value of the variable IX to the value XTMP, and the sequence is returned to return point R1,245 for comparison of the new word with the next successive template.

If, at step 269, the initial state of the template being examined and the new word are equal, the sequence continues at branch step 281, where a comparison is made between the variable IX and the value N to determine whether the end of the template state sequence has been reached, indicating that the comparison is complete and a perfect match has been found for the new word. If the end of the state sequence has not yet been reached, the sequence continues at step 283 by incrementing the variable IX, and at step 285 by setting the variable Y equal to IX and the variable IX equal to XTMP. From this point the program continues to return point 6,261, in order to compare the next state of the template being examined with the next state of the new word. Through this return to the point R6,261, each of the states of the word is successively compared with the states of the template. If any one of the states is different, the comparison which is made at step 269 will force the sequence to disregard the remainder of the template being examined and to immediately begin the examination of the next successive template.

Once an exact match has been located in the template array, as defined by the branching test 281, the sequence continues through return point R5,283, to set the variable Y equal to IX and the variable IX equal to XTMP at step 285 and to increment IX at step 287. This incrementing of IX at step 287 allows the index IX to designate the location REF(IX) at which the word identifier number is stored in the template array. Thus, referring again to Table 2 above, the incrementing which occurs at step 287, once an identical state sequence has been located will increment the index IX to position 5, for example, if the first template were an exact match, so that the value REF(5) would identify the word identifier number 8.

The register ANS is next set at step 289 to the value REF(IX) so that the register ANS stores the word identification number of the matching state template. The microprocessor then outputs this identifier number at step 290 and returns to return point TT16, 117 (FIG. 3) to repeat the entire recognition sequence.

The utility of the present word recognition system is illustrated by the following example. As shown in FIG. 2, the output port B23 may be connected such that its least significant bit, bit B0, is connected to a relay coil 301 which actuates a pair of switch contacts 303. Similarly, the next least significant bit, bit B1, may be connected to a relay coil 305 which actuates a switch pair 307.

The entire system including the microprocessor 17 the high gain audio amplifier 13, the microphone 11, and a battery power supply for the system may be housed within a small toy robot. In this instance, the toy robot may include, for example, a motor 309 connected to rotate the robot's head, and a second motor 311 connected to drive a tractor mechanism to make the robot walk. The robot head rotater 309 is actuated by the switch 303, while the robot's tractor motion is controlled by the switch 307. It can be seen that, if the output word from port B23 is the binary number 01, the robot's head will be rotated, since a binary 1 output at bit B0 will actuate the relay 301 to close the switch 303. Similarly, output of the binary number 10, equivalent to decimal 2, from the port B23, will cause the relay 305 to actuate, closing the switch 307 and causing the robot to walk. Similarly output of the binary number 00 from port B23, will cause all motion of the robot to cease.

The following table, Table 3, is an example of the state sequence templates which would be stored in the read only memory 19 of the microprocessor 17 in order to recognize the English spoken words, "search", "stop", and "go ahead".

TABLE 3

| | |
|---|---|
| 4, 2, 1, 0, 2, 1 | SEARCH |
| 4, 2, 0, 2, 1, 0 | STOP |
| 3, 2, 0, 1, 0 | STOP |
| 5, 2, 0, 1, 0, 1, 0 | STOP |
| 6, 2, 0, 2, 1, 0, 1, 0 | STOP |
| 1, 1, 2 | GO AHEAD |
| FFH | |

These state sequence templates are in the form of Table 2 above, with the first digit identifying the number of states within each sequence and the last digit identifying the output identifier for port B, in this case the binary number 0, 1 or 2 as defined previously.

From the templates listed in Table 3 it can be seen that, while the English words "search" and "go ahead" provide fairly well defined state sequences, the word "stop" may provide a variety of state sequences depending upon the particular individual speaking the word. For this reason, multiple state sequences are stored in template storage for the word "stop" to broaden the recognition capability of the microprocessor for this word.

From Table 3 and the previous description of FIGS. 2-6 it can be seen that, by speaking the words "search", "stop", and "go ahead" into the microphone 11, a user can cause the robot to turn its head, stop, and walk in whatever order the user selects. This is, of course, an extremely simple example, but it shows the utility of the present invention. It should be recognized that the switches 307 and 303 and a variety of other switches connected to the ports 21, 23, and 25 can be used to control a variety of consumer or industrial products in accordance with the identification of spoken words.

The following Table 4 lists a computer program which is compatible with the Motorola Model MC6805P2 HMOS microcomputer utilized in the preferred embodiment. It will be recognized, of course, that, by utilizing the flow chart information of FIGS. 3-6 and the general description given above, the present invention can be implemented using a variety of computer programs or special purpose computing equipment.

TABLE 4

| | |
|---|---|
| .ORG | 3COH |
| LDA | #$FF |
| STA | BDDR |
| STA | CDDR |
| STA | TOYFLG |
| CLR | PORTB |
| CLR | A |
| STA | FCNT |
| STA | VCNT |
| STA | SCNT |
| TAX | |
| STA | N |
| STA | SEG,X |
| STA | VOWL,X |
| LDA | #$7F |
| STA | TIMDAT |
| LDA | #5 |
| STA | DECAY |
| CLR | A |
| INC | A |
| BNE | TT31 |
| DEC | DECAY |
| BNE | TT32 |
| LDA | #$7F |
| SUB | TIMDAT |
| STA | ZCRA |
| BSET∅ | PORTC |
| BCLR∅ | PORTC |
| LDA | #$7F |
| STA | TIMDAT |
| LDA | ZCRA |
| CMP | #2 |
| BPL | TT9 |
| INC | SCNT |
| LDA | SEG,X |
| BEQ | TT12 |
| LDA | SCNT |
| CMP | #3 |
| BPL | TT11 |
| BRA | TT10 |
| LDA | SEG,X |
| CMP | #1 |
| BEQ | TT18 |
| CLR | A |
| STA | VOWL,X |
| BRA | TT19 |
| LDA | VCNT |
| STA | VOWL,X |
| INC | X |
| CLR | A |
| STA | SEG,X |
| STA | VOWL,X |
| CLR | A |
| STA | FCNT |
| STA | VCNT |
| LDA | SCNT |
| CMP | #$10 |
| BMI | TT10 |
| TST | X |
| BEQ | TT16 |
| STX | N |
| TT23 | |
| JMP | TT2 |
| LDA | SEG,X |
| BNE | TT8 |
| LDA | ZCRA |
| CMR | #$10 |
| BPL | TT7 |
| JMP | TT6 |
| CMP | #1 |
| BNE | TT5 |
| LDA | ZCRA |
| CMP | #$18 |
| BPL | TT7 |
| INC | VCNT |

TABLE 4-continued

| | | |
|---|---|---|
| | JMP | TT4 |
| | INC | FCNT |
| | LDA | FCNT |
| | CMP | #2 |
| | BMI | TT3 |
| | LDA | SPG,X |
| | CMP | #1 |
| | BEQ | TT15 |
| | CLR | A |
| | STA | VOWL,X |
| | BRA | TT14 |
| | LDA | VCNT |
| | STA | VOWL,X |
| | INC | X |
| | LDA | #2 |
| | STA | SEG,X |
| | CLR | A |
| | STA | SCNT |
| | STA | VCNT |
| | JMP | TT3 |
| | LDA | ZCRA |
| | CMP | #$10 |
| | BPL | TT17 |
| | INC | VCNT |
| | LDA | VCNT |
| | CMP | #6 |
| | BMI | TT3 |
| | INC | X |
| | LDA | #1 |
| | STA | SEG,X |
| | CLR | A |
| | STA | SCNT |
| | STA | FCNT |
| | JMP | TT2 |
| | DEC | N |
| | LDX | N |
| | LDA | SEG,X |
| | CMP | #1 |
| | BNE | TT21 |
| | CDA | VOWL,X |
| | CMP | #$10 |
| | BPL | TT21 |
| | DEC | X |
| | LDA | SEG,X |
| | TST | A |
| | BNE | REC |
| | DEC | N |
| | LDA | N |
| | CMP | #2 |
| | BPL | TT22 |
| | JMP | TT16 |
| | BNE | REC |
| | LDA | VOWL,X |
| | CMP | #$30 |
| | BPL | REC |
| | JMP | TT16 |
| | INC | N |
| | DEC | N |
| | CLR | X |
| | LDA | #1 |
| | STA | Y |
| | LDA | REF,X |
| | BPL | R2 |
| | JMP | TT16 |
| | CMP | N |
| | BEQ | R3 |
| | TXA | |
| | ADD | REF,X |
| | ADD | #2 |
| | TAX | |
| | BRA | R1 |
| | INC | X |
| | LDA | REF,X |
| | STX | XTMP |
| | LDX | Y |
| | CMP | SEG,X |
| | BNE | R4 |
| | CPX | N |
| | BEQ | R5 |
| | INC | X |
| | STX | Y |
| | INC | XTMP |

TABLE 4-continued

| | | |
|---|---|---|
| | LDX | XTMP |
| | BRA | R6 |
| | STX | Y |
| 5 | LDX | XTMP |
| | INC | X |
| | LDA | REF,X |
| | STA | ANS |
| | BRA | TOY |
| | CPX | N |
| 10 | BEQ | R7 |
| | INC | X |
| | INC | XTMP |
| | BRA | R4 |
| | INC | XTMP |
| | INC | XTMP |
| 15 | STX | Y |
| | LDX | XTMP |
| | JMP | R1 |

From the robot example which is presented above, it can be seen that the present invention provides speaker independence and relatively low error rates by careful preselection of the recognizable vocabulary. Thus, from Table 3 it can be seen that none of the recognizable words "search", "stop", and "go ahead" have any identical state templates. This permits accurate differentiation between these three spoken words, but does not permit differentiation of any of these words from other similar words in the same language. Thus, the present invention excepts this inability to differentiate recognizable words from words outside of the recognizable group in order to simplify the system hardware and thus significantly reduce the cost and complexity of the recognition system.

The system described above includes several important characteristics. Initially, the spoken sounds are periodically sampled and the individual samples are differentiated using zero crossing data alone, without a system front end filter, into fricative-like, vowel-like, and silence intervals. Successive groups of these intervals are counted, and the count must reach a predetermined number in order for the system to define a fricative-like state, vowel-like state, or silence state. The particular number of samples used to define existence of a particular state may depend upon the location of that state within the word. For example, a vowel sound at the end of a word must have a 160-millisecond duration in order to be recognized as a vowel-like state, whereas a vowel sound in the middle of a word must have a duration of only 60 milliseconds to be recognized as a vowel-like state.

The requirement for multiple, sequential, identical intervals in order to achieve state recognition provides, in effect, a first order of system hysteresis, since a change of average frequency content from fricative-like to vowel-like, for example, requires that the vowel-like average remain for some predetermined duration before a vowel-like sequence will be recognized.

A second form of system hysteresis is provided by permitting a variation of the number of zero crossings used to identify a particular sample increment as fricative-like or vowel-like. For example, if the previous state were silence, a zero crossing count of 16 within 10 milliseconds, indicating an average sound frequency above 1600 hertz, will yield a fricative-like interval. If, however, the previous state were a vowel-like state, the zero crossing count must exceed 24, indicating a frequency average above 2400 hertz, a much higher frequency than in the case of a previous silence state. This makes it more difficult to achieve the transition from a vowel-like sound to a fricative-like sound since it has been determined that the termination of a vowel-like sound may often form frequency components in the range between 1600 and 2400 hertz which do not indicate an actual fricative-like sound. Thus, this second order hysteresis is variable, depending upon the previous state.

The system also provided the elimination of short vowel-like states at the end of states sequence, since it has been determined that these often result from the dissipation of energy at the end of a fricative-like sound rather than an actual vowel ending.

What is claimed is:

1. Speech recognition apparatus, comprising:
speech responsive input means for generating an AC signal having a frequency determined by said speech;
a detector for producing digital signals by comparing said AC signal with a threshold signal level;
means for defining time intervals;
means responsive to said digital signals and said time intervals for counting said digital signals within said time intervals;
means responsive to said counting means for comparing the output of said digital signal counting means with plural count thresholds and for thereby categorizing said speech during said time intervals as fricative-like intervals, vowel-like intervals, or silence intervals;
means for counting said fricative-like intervals, vowel-like intervals, and silence intervals to generate interval counts;
means responsive to said interval counts for generating a fricative-like, vowel-like, and silence state sequence for said speech;
means for varying at least one of said plural count thresholds in response to the previous state in said state sequence for said speech;
means for comparing said state sequence with plural state sequence templates to identify a match; and
means for generating an output signal identifying one of said state sequence templates which is identified as an exact match.

2. Speech recognition apparatus, as defined in claim 1, wherein said speech responsive input means comprises:
a high gain amplifier driven to saturation by said speech.

3. Speech recognition apparatus, as defined in claim 2, wherein said speech responsive means additionally comprises:
a microphone for providing a speech input to said amplifier.

4. Speech recognition apparatus, as defined in claim 1, wherein said threshold signal level of said detector is a constant voltage level.

5. Speech recognition apparatus, as defined in claim 1, wherein said means for generating an output signal identifying one of said state sequence templates generates identical output signals for plural ones of said state sequence templates.

6. A speech recognition system, comprising:
a read-only memory permanently storing speech template data for a limited vocabulary, said speech template data defining words selected to be dissimilar;
means for analyzing speech input data, said means comprising:
means for measuring the average speech frequency of said data;
means for comparing said average speech frequency with thresholds to generate speech state sequences of fricative-like, vowel-like, and silence states; and
means for changing at least one of said thresholds in response to a previous state of said speech state sequence; and
means for comparing said speech state sequences with said speech template data to output a signal identifying said speech.

7. A speech recognition system, as defined in claim 6, wherein said read-only memory permanently stores speech template data which defines said limited vocabulary in terms of fricative-like, vowel-like, and silence states in a sequence.

8. A speech recognition system, as defined in claim 6, wherein said read-only memory permanently stores plural speech template data defining one of said words selected to be dissimilar.

9. A method for recognizing speech signals, comprising:
providing an analog electrical signal identifying the frequency content of said speech signals;
first comparing said analog electrical signal with a threshold level to provide digital signals when said analog electrical signals cross said threshold level;
first counting said digital signals during plural predetermined time increments to generate a digital count signal;
second comparing said digital count signal with plural count thresholds to identify the average frequency content of said speech signals during said plural time increments;
second counting successive ones of said plural time increments which have similar average frequency content;
third comparing the number of successive ones of said plural time increments which have similar average frequency content with a predetermined count to define a state for said speech signals and to thereby provide a state sequence for said speech signals;
varying said predetermined count in response to the location of said speech signal state within said state sequence; and
fourth comparing said state sequence with plural stored state sequence templates to recognize said speech signals.

10. A method for recognizing speech signals as defined in claim 9 wherein said providing step comprises amplifying said analog electrical signal in a high-grain, hard limited amplifier.

11. A method for recognizing speech signals as defined in claim 9 wherein said third comparing step compares said state sequence with plural state sequence templates permanently stored in a read-only memory.

12. A method for recognizing speech signals as defined in claim 9 additionally comprising:
eliminating terminal states from said state sequence in response to said second counting step.

13. In a programmed computer system for recognizing human speech patterns in response to analog signals identifying the frequency of said analog signals, a data structure for comparing said speech patterns with stored templates, comprising:
a. first means in said data structure and responsive to said analog signals for storing first coded signals indicative of the average frequency of said analog signals during successive time intervals;

b. second means in said data structure responsive to said first coded signals for comparing said first coded signals with count threshold values stored in said data structure to identify a frequency characteristic of said analog signals corresponding to the existence of fricative-like, vowel-like, and silence intervals during each of said successive time intervals;

c. third means in said data structure for varying said count threshold values in response to a previous state of said analog signal frequency characteristic;

d. fourth means in said data structure responsive to said time interval frequency characteristic for storing a coded signal indicative of the number of successive time intervals having an identical frequency characteristic;

e. fifth means in said data structure and responsive to said fourth means for storing coded signals indicative of groups of successive time intervals with an identical frequency characteristic which exceed, in number, a value stored as a coded signal in said data structure;

f. sixth means in said data structure storing coded signals indicative of recognition templates; and g. seventh means in said data structure for comparing said coded signals stored by said fifth means with said coded signals stored by said sixth means.

14. A method for recognizing human speech, comprising:

identifying segments of said speech by frequency discrimination;

providing hysteresis for limiting frequency discrimination identification changes for successive segments of said speech; and comparing said speech segments with speech templates for recognition.

15. A method for recognizing human speech as defined in claim 14 wherein said hysteresis providing step comprises:

requiring that said frequency discrimination identification segments have a predetermined length.

16. A method for recognizing human speech as defined in claim 15 additionally comprising:

changing said predetermined length in response to previously identified segments of said speech.

17. A speech recognition apparatus as defined in claim 1, wherein said means responsive to said counting means for categorizing said speech during said time intervals is also responsive to the location of an interval state within a state sequence.

18. A speech recognition apparatus, as defined in claim 1, wherein said means responsive to said counting means for categorizing said speech during said time intervals, has plural, predetermined durational thresholds for categorizing said intervals.

19. A programmed computer system as defined in claim 13, wherein said second means is also responsive to time durational threshold values stored in said data structure.

20. Speech recognition apparatus, comprising:

speech responsive input means for generating an AC signal having a frequency determined by said speech;

a detector for producing digital signals by comparing said AC signal with a threshold signal level;

means for defining time intervals;

means responsive to said digital signals and said time intervals for counting said digital signals within said time intervals;

means responsive to said counting means for categorizing said speech during said time intervals as fricative-like intervals, vowel-like intervals, or silence intervals;

means for counting said fricative-like intervals, vowel-like intervals, and silence intervals to generate interval counts;

means responsive to said interval counts for generating a fricative-like, vowel-like, and silence state sequence for said speech, said means comprising:

means for comparing said interval counts with a count threshold; and means for varying said count threshold in response to the location of a state within said state sequence;

means for comparing said state sequence with plural state sequence templates to identify a match; and means for generating an output signal identifying one of said state sequence templates which is identified as an exact match.

* * * * *

UNITED STATES PATENT AND TRADEMARK OFFICE
CERTIFICATE OF CORRECTION

PATENT NO. : 4,388,495
DATED : November 23, 1983
INVENTOR(S) : Myron H. Hitchcock It is certified that error appears in the above-identified patent and that said Letters Patent are hereby corrected as shown below:

In column 16, Line 6 after "Table 4" please insert
--© Copyright 1981 Interstate Electronics Corporation,
All Rights Reserved--

Signed and Sealed this

Twenty-fifth Day of September 1984

[SEAL]

Attest:

GERALD J. MOSSINGHOFF

Attesting Officer

Commissioner of Patents and Trademarks